United States Patent
Holzer et al.

(10) Patent No.: US 12,494,017 B2
(45) Date of Patent: Dec. 9, 2025

(54) AUTOMATICALLY GENERATING SYNTHETIC IMAGES FROM NOVEL VIEWPOINTS

(71) Applicant: Fyusion, Inc., San Francisco, CA (US)

(72) Inventors: Stefan Johannes Josef Holzer, San Mateo, CA (US); Rodrigo Ortiz-Cayon, San Francisco, CA (US); Tanvir Parhar, San Francisco, CA (US); Matteo Munaro, San Francisco, CA (US); Martin Saelzle, San Francisco, CA (US)

(73) Assignee: FYUSION, INC., San Francisco, CA (US)

( * ) Notice: Subject to any disclaimer, the term of this patent is extended or adjusted under 35 U.S.C. 154(b) by 181 days.

(21) Appl. No.: 18/462,186

(22) Filed: Sep. 6, 2023

(65) Prior Publication Data
US 2025/0078403 A1 Mar. 6, 2025

(51) Int. Cl.
G06T 17/00 (2006.01)
G06T 7/00 (2017.01)
G06T 11/60 (2006.01)

(52) U.S. Cl.
CPC .......... G06T 17/00 (2013.01); G06T 7/0004 (2013.01); G06T 11/60 (2013.01)

(58) Field of Classification Search
CPC . G06T 2219/2021; G06T 19/20; G06T 11/00; G06T 11/60; G06T 17/00; G06T 7/0004; G06T 2207/20084; G06T 2207/20081; G06T 7/12; G06T 15/20
See application file for complete search history.

(56) References Cited

U.S. PATENT DOCUMENTS

| | | | |
|---|---|---|---|
| 11,272,153 B2 * | 3/2022 | Shikata | G06T 7/70 |
| 2018/0300576 A1* | 10/2018 | Dalyac | G06N 20/00 |
| 2021/0256761 A1* | 8/2021 | Mahdizadehaghdam | G06T 15/20 |
| 2022/0148050 A1* | 5/2022 | Gandhi | G06N 3/08 |
| 2022/0297291 A1* | 9/2022 | Van Parys | B25J 9/1653 |
| 2022/0358775 A1* | 11/2022 | Hantehzadeh | G06T 7/70 |
| 2023/0269356 A1* | 8/2023 | Kawabata | H04N 23/90 348/48 |
| 2023/0291883 A1* | 9/2023 | Maeda | H04N 13/117 |
| 2023/0410422 A1* | 12/2023 | Aron | G06V 10/44 |
| 2024/0037843 A1* | 2/2024 | Iwamoto | H04N 5/2224 |

OTHER PUBLICATIONS

Arcidiacono, C. S. (2018). An empirical study on synthetic image generation techniques for object detectors (p. 91). KTH Royal Institute of Technology.

(Continued)

*Primary Examiner* — Phi Hoang
(74) *Attorney, Agent, or Firm* — Kwan & Olynick LLP

(57) ABSTRACT

A plurality of images of an object and a background may be captured. Three-dimensional representations of the background and the object may be generated based on the captured images. A synthetic image of the object and the background may be rendered. The synthetic image may depict a two-dimensional view of the object having a novel viewpoint different from the viewpoints of the captured images. A corrected synthetic image may be generated. The corrected synthetic image may be stored on a storage medium.

17 Claims, 10 Drawing Sheets

(56) References Cited

OTHER PUBLICATIONS

Bittner, Dominik & Ferreira, João Filipe & Andrada, Maria & Bird, Jordan & Portugal, David. (2022). Generating Synthetic Multispectral Images for Semantic Segmentation in Forestry Applications, 7 pages.

Lukas Block, et al., "Image-Bot: Generating Synthetic Object Detection Datasets for Small and Medium-Sized Manufacturing Companies," 55th CIRP Conference on Manufacturing Systems, Procedia CIRP 107 (2022) 434-439.

Mousa Zeid Baker, "Generation of Synthetic Images withGenerative Adversarial Networks," Department of Computer Science and Engineering, Jan. 2018, SE-371 79 Karlskrona, Sweden, 67 pages.

Waechter, Michael, Nils Moehrle, and Michael Goesele. "Let there be color! Large-scale texturing of 3D reconstructions." Computer Vision—ECCV 2014: 13th European Conference, Zurich, Switzerland, Sep. 6-12, 2014, Proceedings, Part V 13. Springer International Publishing, 2014.

International Application Serial No. PCT/US2024/043928, International Search Report and Written Opinion, mailed Nov. 18, 2024, 9 pages.

Anonymous, "3D Scanning Cars With Photogrammetry", Retrieved from the Internet: https://web.archive.org/web/20211023040026, Nov. 21, 2016, 3 pages.

Ching-Ta Lu et al., "Image Enhancement Using Convolutional Neural Network to Identify Similar Patterns", IET Image Processing, vol. 14, No. 15, Feb. 18, 2021, 10 pages.

Sahil Naik, Enhancing Photorealism Enhancement with Convolutional Neural Networks (CNN), retrieved from Internet, https://web.archive.org/web/20220804055702, Aug. 4, 2022, 7 pages.

Tommy Messaoudi et al., "Laying the Foundation for an Information System Dedicated to Heritage Building Degradation Monitoring Based on the 2D/3D Semantic Annotation of Photographs", Feb. 19, 2018, 5 pages.

* cited by examiner

AUTOMATICALLY GENERATING SYNTHETIC IMAGES FROM NOVEL VIEWPOINTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to image processing, and more specifically to generating synthetic images from novel viewpoints.

BACKGROUND

Accurate automated damage assessment models consume a large amount of training data. Simply using images taken from cameras limits the amount and content of available training data.

BRIEF DESCRIPTION OF DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

Figure 1:
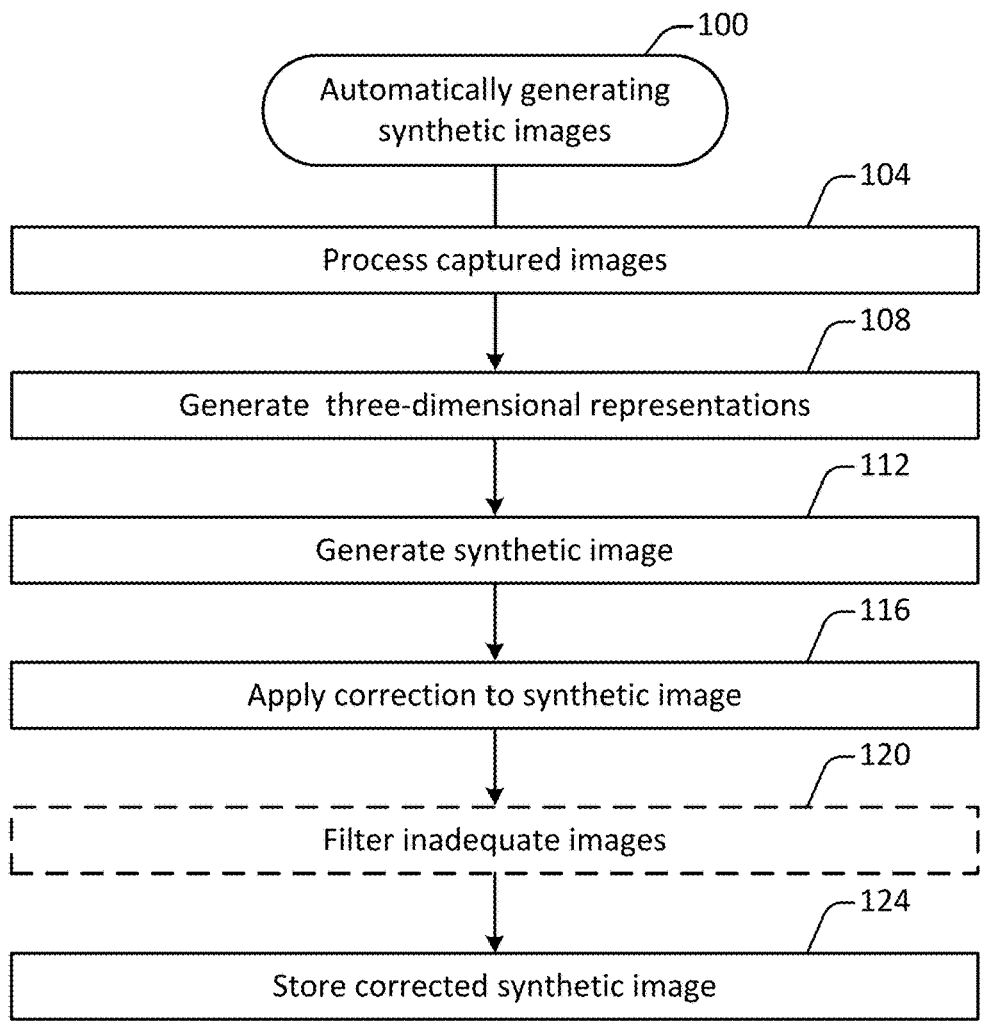
FIG. 1 illustrates a method for automatically generating synthetic images from novel viewpoints, performed in accordance with some implementations.

The various embodiments, techniques and mechanisms described herein provide for automated generation of synthetic images from novel viewpoints. While many examples discussed herein relate to images of cars associated with damage assessment models, the disclosed techniques are widely applicable to images of any type of object. Additionally, frames from multi-view captures of an object, such as a car, are often used as examples of types of images. One having skill in the art can appreciate that discussion of such frames may be interchanged with any other types of images of any object of interest.

Some implementations described herein relate to propagation of annotations. Such annotations may be of any type, e.g., points of interest associated with the object, bounding boxes for deep learning-based detectors, pixel masks for semantic segmentation networks, etc. While many examples discussed herein relate to annotations associated with vehicular damage assessment models, the disclosed techniques are widely applicable to annotations in images of any type of object.

Accurate automated damage assessment models consume a large amount of training data. Conventional techniques that rely on only captured images from cameras limit the quantity of available training data. Moreover, traditional methods cannot be used to generate annotations for novel viewpoints (e.g., viewpoints that are not contained in an original camera capture.) By way of example, Arden Automotive utilizes 360-degree captures of damaged cars for use as training data in their damage assessment model. Such 360-degree captures are generated using images taken with a camera from camera positions around cars. These images are annotated and used as training data to be consumed by models (such as neural networks) that automatically assess damage in images of cars. Unfortunately, the camera viewpoints used in the generation of these 360-degree captures do not adequately capture damages from a variety of viewpoints such as oblique views of headlights and windows. Furthermore, since they are limited to images captured by cameras, Arden Automotive must capture numerous images from difficult (if not impossible) to reach viewpoints, to fully train their models. Consequently, their models are under-trained resulting in their frequent inaccurate assessment of damage.

By contrast, applying the disclosed techniques, each 360-degree capture can be utilized to generate and automatically annotate additional synthetic images. By way of illustration, returning to the above example, a 360-degree capture of a damaged car may be completed. A three-dimensional representation of the car and background may be generated and texturized. Synthetic images may be rendered for a variety of novel viewpoints for each captured image of the damaged car. As discussed in further detail below, a Generative Adversarial Network (GAN) can be trained specifically to improve the realism of these rendered synthetic images. These synthetic images depict a damaged bumper from an oblique view not captured in Arden Automotive's typical 360-degree capture. These synthetic images may then be automatically annotated. Therefore, Arden Automotive is provided with a larger set of training data with more complete views. Subsequently, their models are well-trained resulting in substantially more accurate assessment of damage.

Furthermore, manually annotating training data may be a time-consuming process, leaving room for human error. However, in contrast to conventional approaches, the disclosed techniques may be used to automatically propagate annotations. Returning to the above example, the disclosed techniques may be implemented to automatically propagate annotations to thousands of synthetic images. These thousands of correctly annotated images may be used as training data for the damage assessment model, saving valuable resources and improving model accuracy.

One having skill in the art can appreciate that the disclosed techniques may be implemented for a variety of purposes beyond generating and annotating training data for damage assessment. By way of example, synthetic images from novel viewpoints may be used for interpolating 360-degree captures of an object between images captured by a camera, the disclosed techniques may be implemented to train a network for generating three-dimensional reconstructions of objects such as cars, etc.

Figure 2:
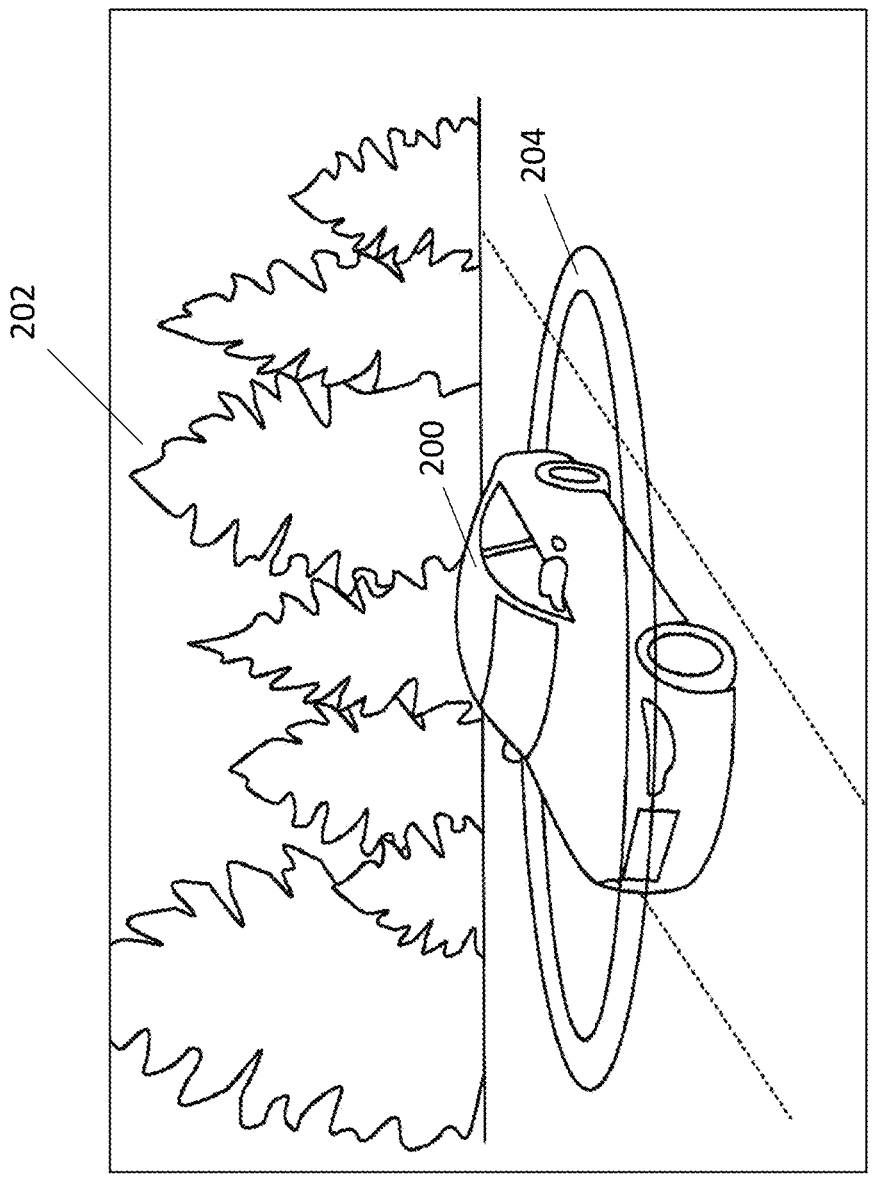
FIG. 2 illustrates an arrangement of camera positions of camera(s) taking a multi-view capture of a car, in accordance with some implementations.
Figure 3:
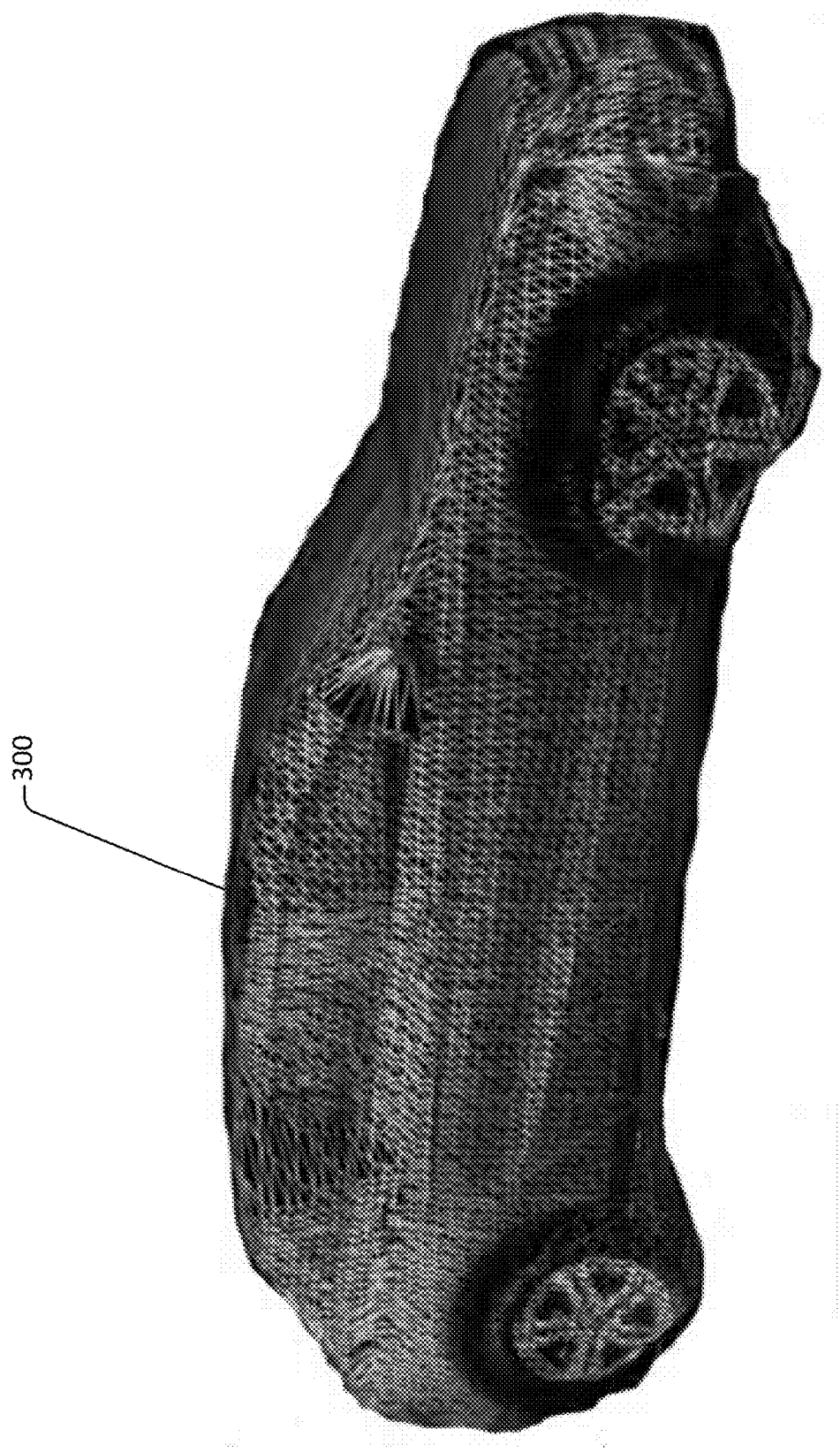
FIG. 3 illustrates an example of a three-dimensional representation of a car in the form of a texturized three-dimensional mesh, in accordance with some implementations.
Figure 4:
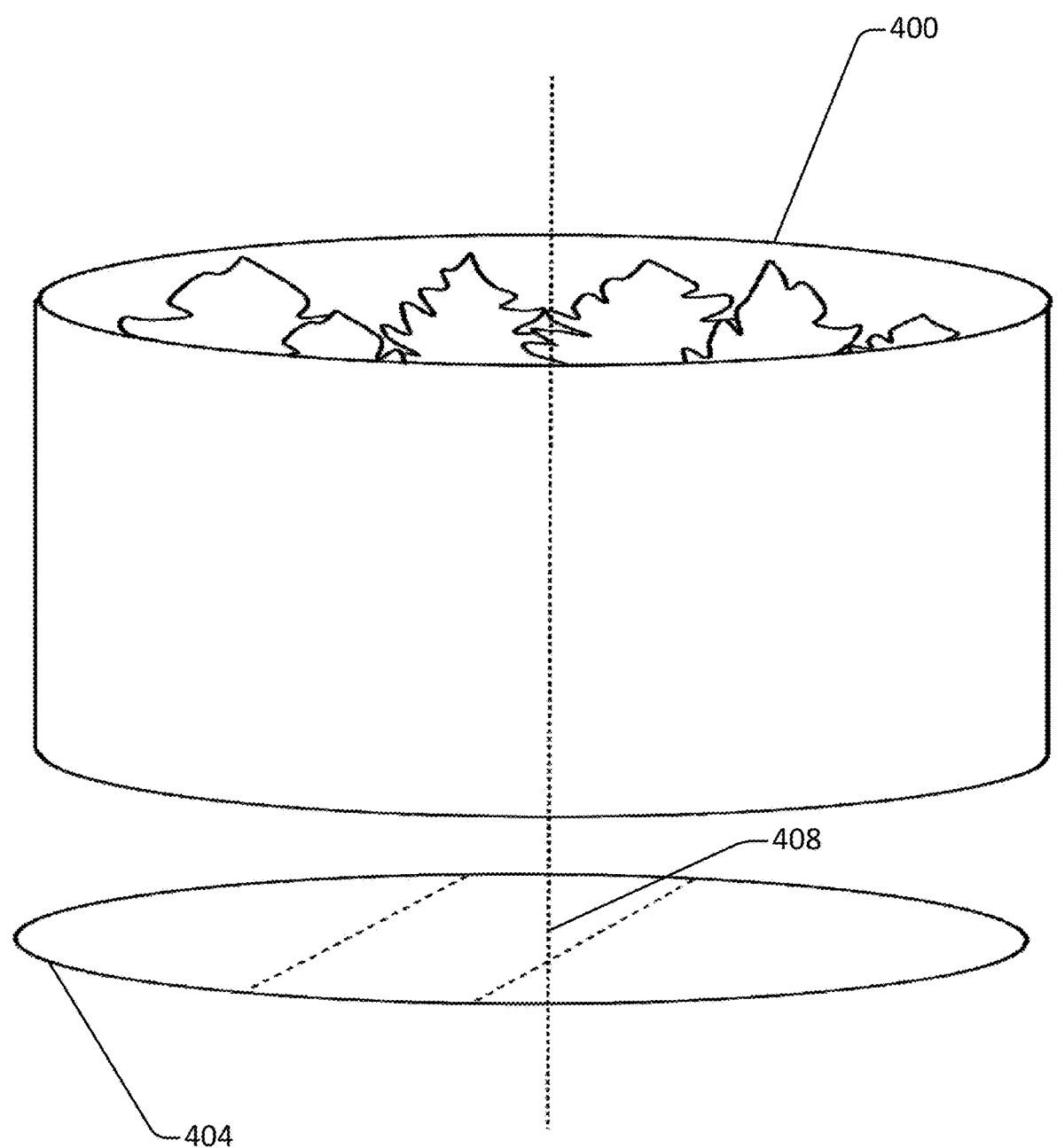
FIG. 4 illustrates an example of a three-dimensional representation of a background, in accordance with some implementations.
Figure 5:
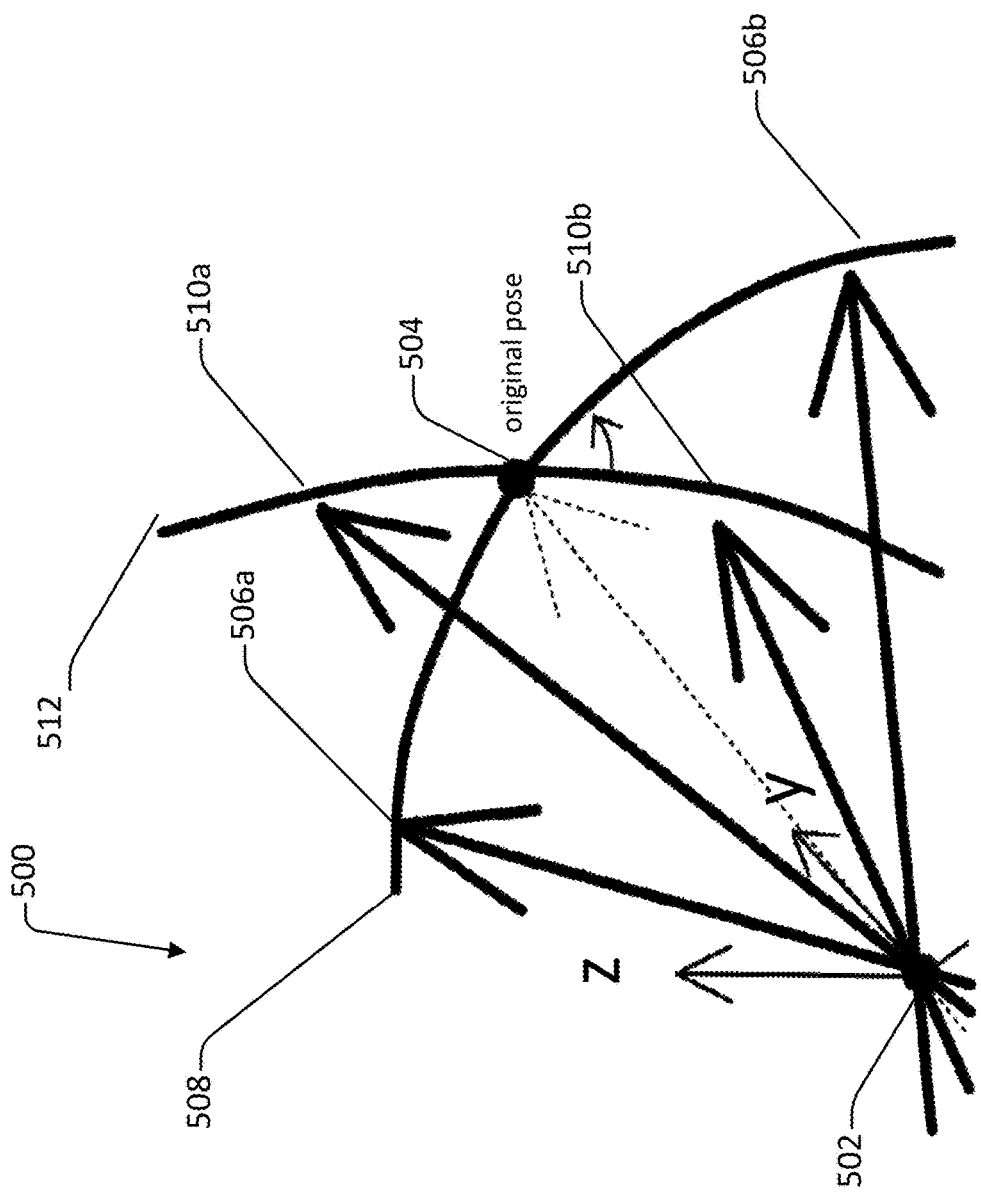
FIG. 5 illustrates an example of a placement of four novel viewpoints, in accordance with some implementations.
Figure 6:
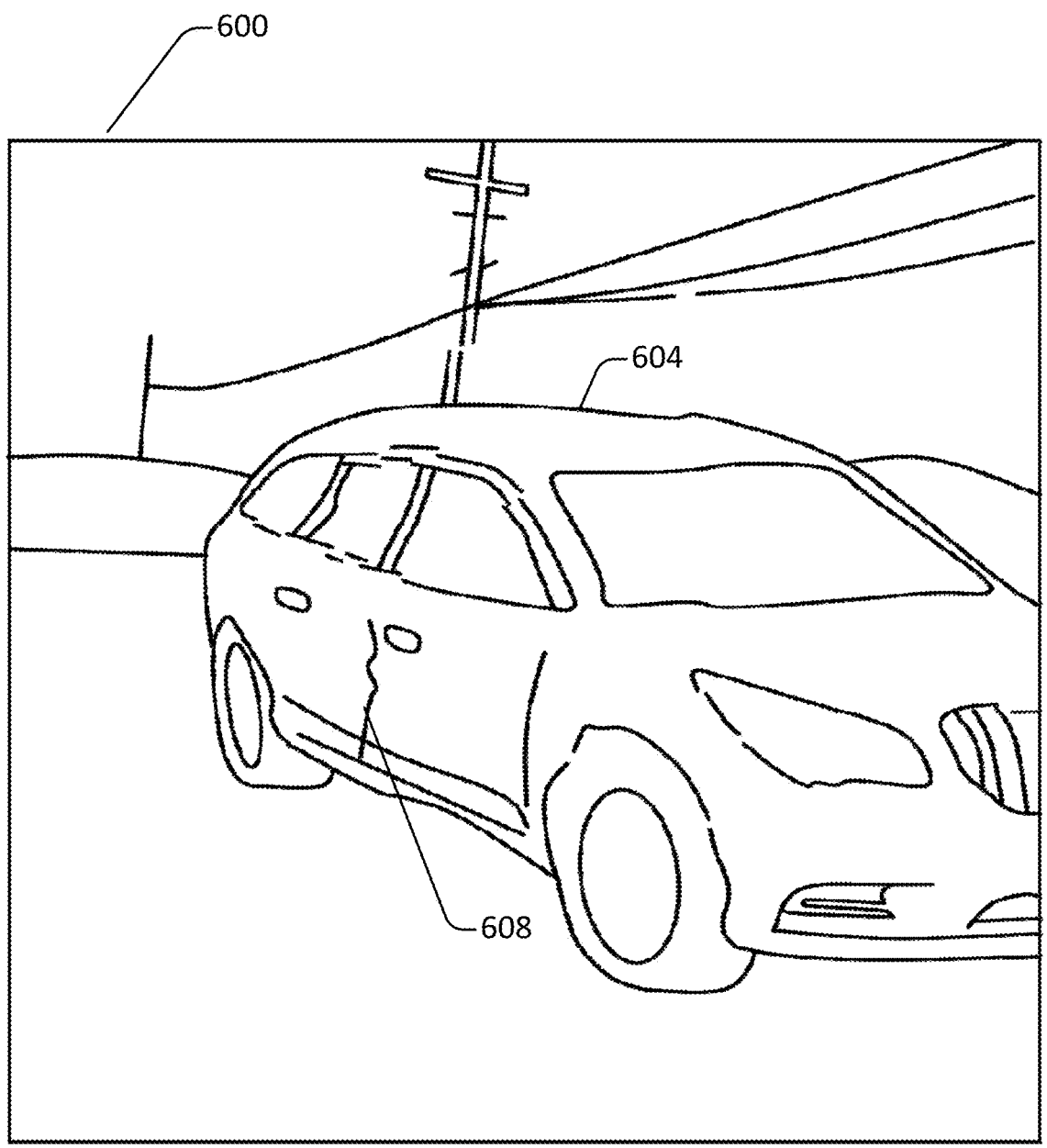
FIG. 6 illustrates an example of a rendered synthetic image of a car from a novel viewpoint, in accordance with some implementations.
Figure 7:
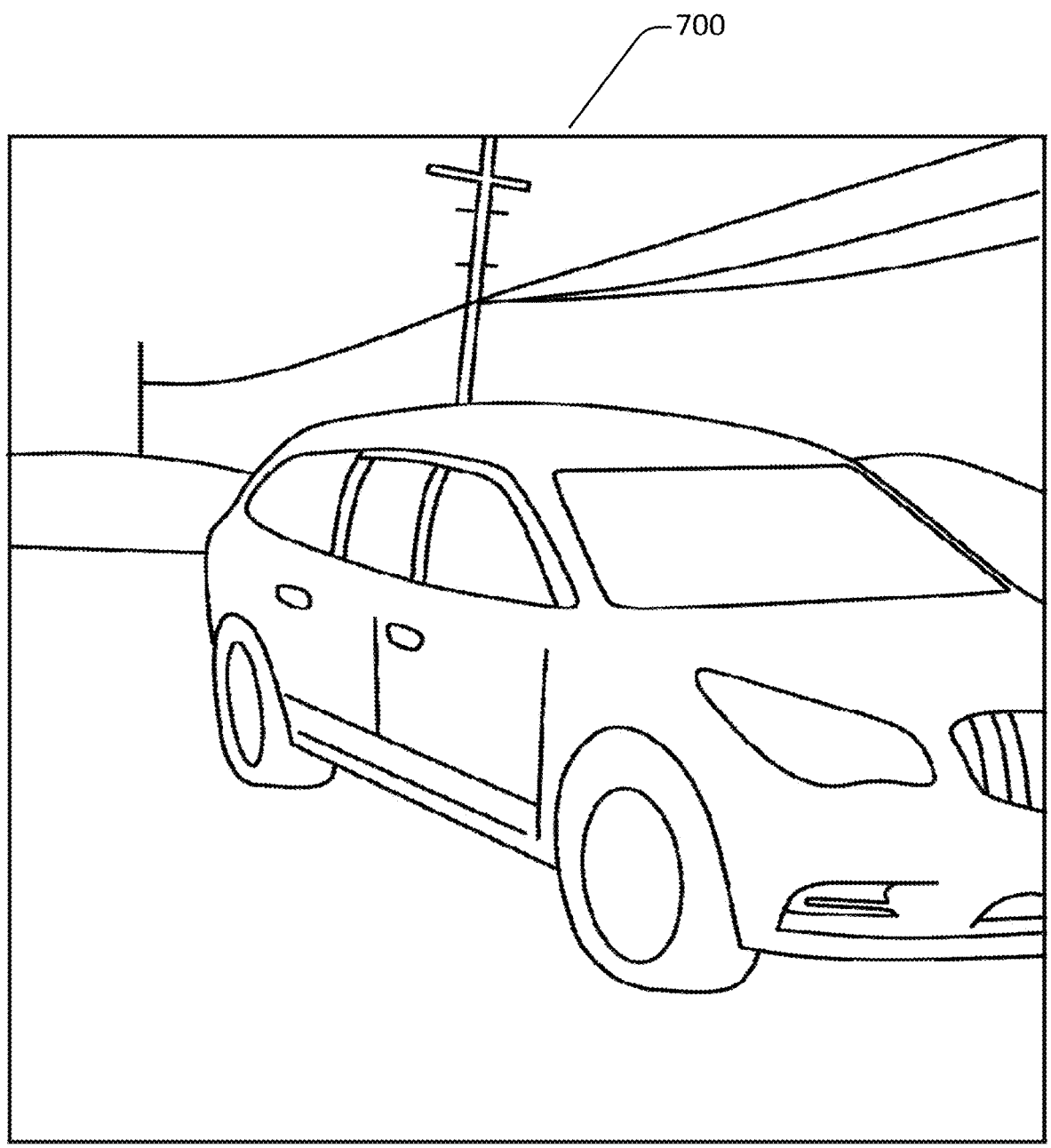
FIG. 7 illustrates an example of a corrected synthetic image of a car from a novel viewpoint, in accordance with some implementations.

Referring now to the Figures, FIG. 1 illustrates a method for automatically generating synthetic images from novel viewpoints, performed in accordance with some implementations. FIG. 1 is discussed in the context of FIGS. 2-7. FIG. 2 illustrates an arrangement of camera positions of camera(s) taking a multi-view capture of a car, in accordance with some implementations. FIG. 3 illustrates an example of a three-dimensional representation of a car in the form of a three-dimensional mesh, in accordance with some implementations. FIG. 4 illustrates an example of a three-dimensional representation of a background, in accordance with some implementations. FIG. 5 illustrates an example of a placement of four novel viewpoints, in accordance with some implementations. FIG. 6 illustrates an example of a rendered synthetic image of a car from a novel viewpoint, in accordance with some implementations. FIG. 7 illustrates an example of a corrected synthetic image of a car from a novel viewpoint, in accordance with some implementations.

At 104 of FIG. 1, images are processed. By way of example, a computing system may receive a set of images of an object such as a car. The images may be captured in a variety of manners from any type of camera. Each image may be captured from a viewpoint with a designated angle with respect to the object. The images may include any combination of multi-view or single view captures of the object. By way of example, the object may be a car and the images of the car may be captured in a manner outlined in U.S. patent application Ser. No. 17/649,793 by Holzer, et al, which is incorporated by reference herein in its entirety and for all purposes.

By way of illustration, FIG. 2 depicts a plurality of captured images of a car 200 and a background 202. Each image of the car 200 may be captured from a respective viewpoint 204 with a designated angle with respect to the car 200. In other words, viewpoints 204 may represent camera positions of camera(s) taking a multi-view capture of the car 200.

Returning to FIG. 1, at 108, three-dimensional representations of the object and background are generated based on the images processed at 104. Generating such three-dimensional representations may be accomplished in a variety of manners, for example, in some implementations, such a representation may be generated by first generating geometric representations of the object and background.

In some implementations, a geometric representation of an object may be generated by approximating the object's shape via a three-dimensional mesh. By way of example, the geometry of the car 200 of FIG. 2 may be represented geometrically by three-dimensional mesh 300 of FIG. 3.

One having skill in the art may appreciate that a variety of geometric representations beyond meshes such as three-dimensional mesh 300 of FIG. 3 may be used in conjunction with the disclosed techniques. For instance, some examples of types of three-dimensional representations include point-clouds, dense and sparse meshes, three-dimensional skeleton key points of the object of interest, etc. As a further generalization, the disclosed techniques may be implemented without an explicit three-dimensional representation of the object, instead exploiting pixel-level correspondences. Such correspondences may be inferred by a neural network that learns a semantic mapping from a perspective image to a consistent space, such that there is a one-to-one mapping from images to the space (see e.g., U.S. patent application Ser. No. 16/518,501 by Holzer et al, which is incorporated herein in its entirety and for all purposes.)

In some implementations, the geometry of the background may be represented. a cylinder and a disk. For example, the background 202 of FIG. 2 may be represented by cylinder 400 and disk 404 of FIG. 4. Therefore, a representation of the entire scene may be created by placing the three-dimensional representation of the object at the center of the disk at the base of the cylinder (e.g., at point 408 of FIG. 4.)

In some implementations, once the geometric representations of the object and background are generated, techniques may be applied to make these geometric representations more realistic. By way of illustration, the three-dimensional mesh 300 of FIG. 3 has been texturized to represent not only the shape of the car 200 of FIG. 2 but also surface features of the car 200 such as the colors of the surface of the car 200. In general, such texturization may be applied to geometric representations of objects to create a three-dimensional representation of the object such that the surface of the three-dimensional representation of the object resembles the surface of the object as depicted in the captured images. Such texturization may be accomplished in a variety of manners. By way of illustration, some suitable texturization techniques are disclosed in the paper Waechter, M., Moehrle, N., & Goesele, M. (2014). "Let there be color! Large-scale texturing of 3D reconstructions." In Computer Vision-ECCV 2014: 13th European Conference, Zurich, Switzerland, September 6-12, 2014, Proceedings, Part V 13 (pp. 836-850). Springer International Publishing (referred to herein as "Waechter et al (2014)".)

In some implementations, the techniques taught by Waechter et al (2014) may be applied to provide texture to three-dimensional representations (e.g., the three-dimensional mesh 300 of FIG. 3). By way of example, given captured images, their corresponding camera pose, and the three-dimensional representations generated at 108 of FIG. 1, the approach taught by Waechter et al (2014) may be implemented assign a texture to each surface tile of a three-dimensional representation (e.g., triangles of a three-dimensional mesh). Additionally, the colors of these texturized surface tiles may then be corrected by applying a photo consistency check and seam leveling.

At 112 of FIG. 1, a synthetic image (e.g., synthetic image 600 of FIG. 6, discussed further below) of the object and the background is rendered. The rendered synthetic image may depict a two-dimensional view of the object having a viewpoint different from the viewpoints of the captured images processed at 104. The synthetic image may be rendered from the three-dimensional representations of the object and background generated at 108 of FIG. 1.

The viewpoints at which the synthetic images are rendered may be selected in a variety of manners. By way of illustration, in FIG. 5, pivot point 502 may be centroid of the three-dimensional representation of the object of interest (e.g., the car 200 of FIG. 2.) Camera position 504 of FIG. 5 may be the location of a camera that captured an image of the car 200 from one of the viewpoints 204 of FIG. 2.

Novel viewpoints at which synthetic images are rendered may be in any plane with respect to positions of cameras capturing images of the object. By way of illustration, novel viewpoint positions 506a and b are along an arc 508 in the horizontal plane. Novel viewpoint positions 510a and b are along an arc 512 in the vertical plane.

In some implementations, the angular distance between the camera position 504 and novel viewpoint positions 506a and b and 510a and b at which synthetic images are rendered may vary. By way of example, a smaller angular distance between the camera position 504 and novel viewpoint positions viewpoint positions 506a and b and 510a and b may lead to a rendered image that is closer to the captured images processed at 104 of FIG. 1.

Also or alternatively, the angular distance between the camera position 504 and each of the novel viewpoint positions 506a and b and 510a and b may be different and may vary randomly.

In some implementations, there may be constraints as to the location of novel viewpoints at which synthetic images are rendered. By way of example, in FIG. 5, there may be no novel viewpoints at which synthetic images are rendered with a negative z coordinate because images with viewpoints that are beneath the floor may not make sense.

In some implementations, the pivot point 502 of FIG. 5 may not be placed at a centroid of the three-dimensional representation of the object of interest. By way of example, rather than a car itself, the car's right front headlight may be an important point for the purposes of damage assessment and may, therefore, be used as the pivot point 502.

Synthetic image 600 of FIG. 6 may be rendered at the novel viewpoint position 506a of FIG. 5. Synthetic images may also be rendered at novel viewpoint position 506b and 510a and b of FIG. 5. The process depicted in FIG. 5 may then be repeated for each of the viewpoints 204 of FIG. 2 such that for each image of the car 200 that is captured by a camera, four synthetic images may be rendered.

At 116 of FIG. 1, a corrected synthetic image is generated based on the rendered synthetic image. By way of example, the synthetic image 600 of FIG. 6 contains imperfections causing car 604 to appear unrealistic. Furthermore, the texturization of a 3D representation can sometimes present some seams or in general it may not be perceived as fully realistic. For instance, doors 608 are distorted. Therefore, synthetic image 600 of FIG. 6 may be corrected to appear substantially more realistic.

In some implementations, synthetic images may be corrected by using a Generative Adversarial Network (GAN) trained to transform rendered synthetic images to appear substantially more realistic. The GAN may be trained by comparing renderings corresponding to viewpoints of cameras that captured images of the object of interest and to the actual captured images from these viewpoints. By way of illustration, a particular image of the car 200 of FIG. 2 may be captured from a particular viewpoint 204. Similarly, an image from the same viewpoint 204 may be rendered from the texturized three-dimensional mesh 300 of FIG. 3 and the background depicted FIG. 4. The GAN can be trained to transform rendered images to appear more like captured images by using the rendered image as input training data and the captured image corresponding to the same viewpoint 204 as output training data. This process may be repeated for each viewpoint 204 such that the GAN learns to transform the images rendered at each viewpoint 204 to the actual images captured by cameras at each viewpoint 204.

Therefore, the GAN may take the synthetic image 600 of FIG. 6 as input and transform the synthetic image 600 of FIG. 6 to the corrected synthetic image 700 of FIG. 7, which appears as a substantially more realistic synthetic image of the car 200 of FIG. 2.

In some implementations, at 120 of FIG. 1, inadequate synthetic images may be filtered. By way of example, a synthetic image may have been generated from a novel viewpoint for which there is not sufficient information to generate the synthetic image.

Such filtering may occur in a variety of manners. By way of illustration, it may be determined that the corrected synthetic image is inadequate. Responsive to the determination that the corrected synthetic image is inadequate, the corrected synthetic image may be discarded.

The determination that the corrected synthetic image is inadequate may vary across implementations. By way of example, determination that the corrected synthetic image is inadequate may include determining that overlap between the rendered synthetic image and the corrected synthetic image is lower than a threshold. For instance, if the GAN transforms the rendered image so much that the overlap between the rendered synthetic image and the corrected synthetic image is lower than 90% (or any chosen threshold), the corrected synthetic image may be determined to be inadequate and thereby discarded.

Also or alternatively, a first silhouette of the object may be extracted from the corrected synthetic image using a neural network. A second silhouette, from the same viewpoint as the corrected synthetic image, may be extracted from the three-dimensional representation of the object. The first silhouette may be intersected with the second silhouette. If the overlap between the first and second silhouettes is below a particular threshold (e.g., 99%, 95%, 90%, etc.), the corrected synthetic image may be determined to be inadequate and thereby discarded.

Returning to FIG. 1, at 124, the corrected synthetic image is stored on a storage medium. By way of illustration, a computing system may cause the corrected synthetic image generated at 116 of FIG. 1 to be stored on a non-transitory storage medium such as storage device 1005 of FIG. 5, discussed further below.

In some implementations, 112-124 of FIG. 1 may be repeated such that corrected synthetic images are generated and stored for any number of novel viewpoints.

Figure 8:
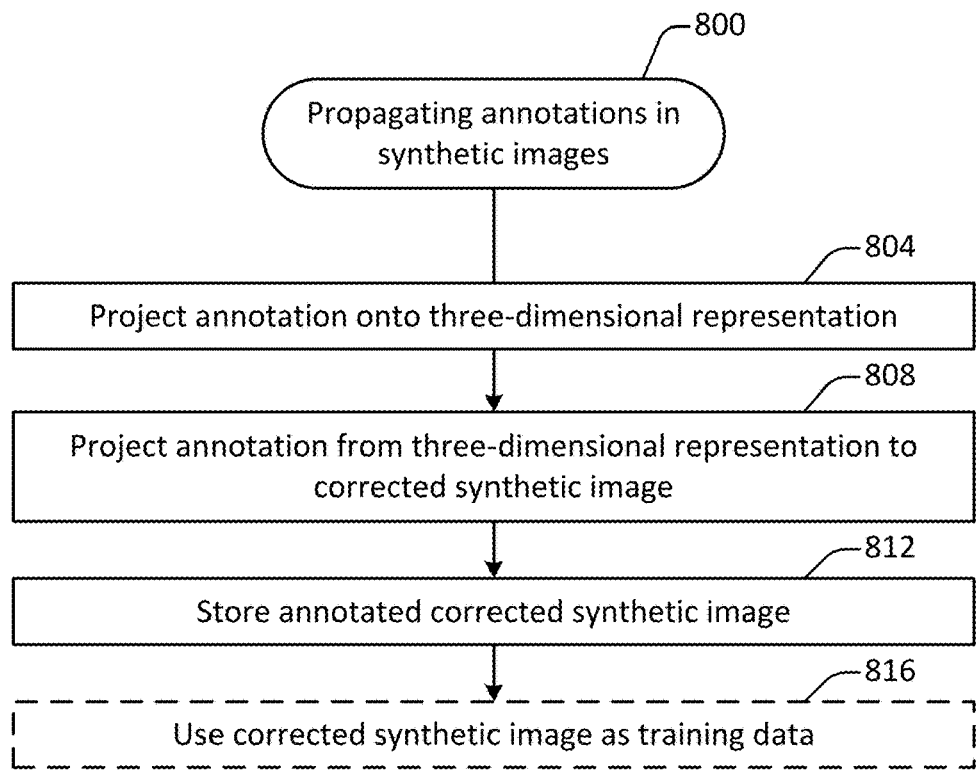
FIG. 8 illustrates a method for propagating annotations in synthetic images, performed in accordance with some implementations.
Figure 9C:
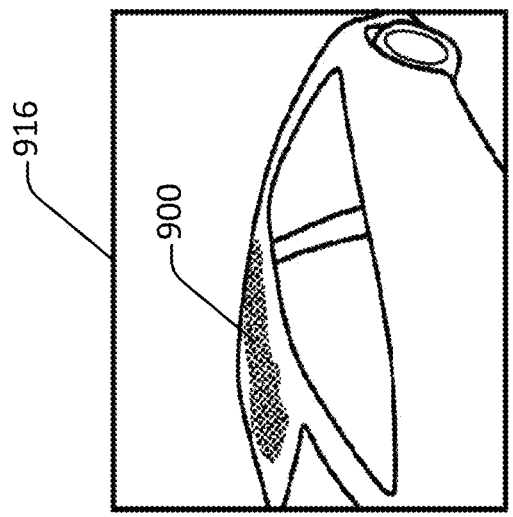
FIG. 9C illustrates an example of a mask propagated onto a synthetic image of a car from a novel viewpoint, in accordance with some implementations.
Figure 9B:
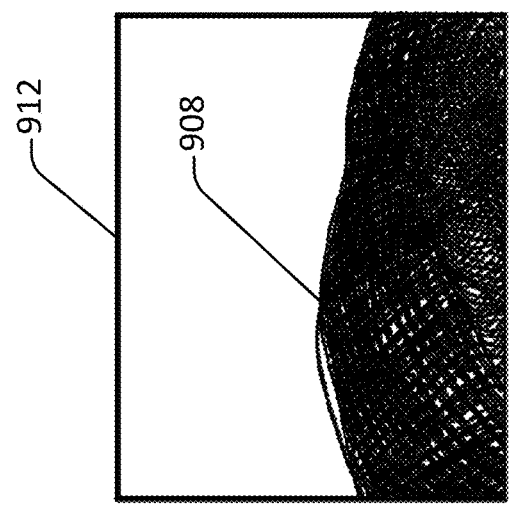
FIG. 9B illustrates an example of a three-dimensional representation of a car overlaid on an image of the car, in accordance with some implementations.
Figure 9A:
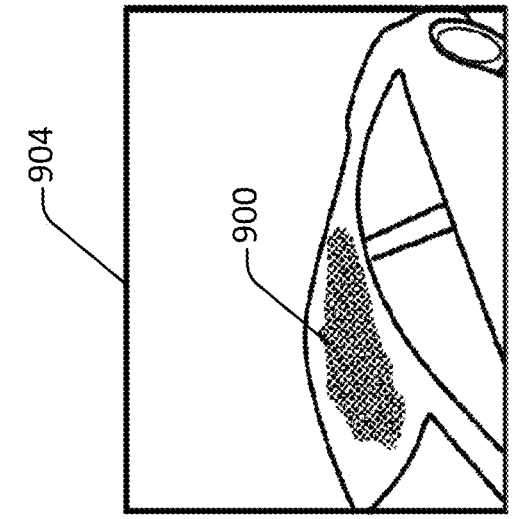
FIG. 9A illustrates an example of a mask manually overlaid on a captured image of a car, in accordance with some implementations.

As discussed above, the disclosed techniques may be applied to propagate annotations in images with novel viewpoints. For instance, FIG. 8 illustrates method 800 for propagating annotations in synthetic images, performed in accordance with some implementations. FIG. 8 is discussed in the context of FIGS. 9A-C. FIG. 9A illustrates an example of a mask manually overlaid on a captured image of a car, in accordance with some implementations. FIG. 9B illustrates an example of a three-dimensional representation of a car overlaid on an image of the car, in accordance with some implementations. FIG. 9C illustrates an example of a mask propagated onto a synthetic image of a car from a novel viewpoint, in accordance with some implementations.

At 804 of FIG. 8, an annotation is projected from a manually annotated image to a three-dimensional representation. By way of illustration, the mask 900 of FIG. 9A may be projected onto the three-dimensional representation 908 of FIG. 9B. The image 904 of FIG. 9A may be an image captured by a camera and the three-dimensional representation 908 may be a three-dimensional representation of a car as discussed above, e.g., the texturized three-dimensional mesh 300 of FIG. 3.

At 808 of FIG. 8, the annotation is projected from the three-dimensional representation to unannotated image(s). By way of illustration, mask 900 may be projected from the three-dimensional representation 908 of FIG. 9B to corrected synthetic image 916 of the car as depicted in FIG. 9C. The corrected synthetic image 916 may be any corrected synthetic image discussed herein such as the corrected synthetic image 700 of FIG. 7.

At 812 of FIG. 1, the annotated corrected synthetic image may be stored on a storage medium. By way of illustration, a computing system may cause the images for which annotations were added at 808 of FIG. 8 to be stored on a non-transitory storage medium such as storage device 1005 of FIG. 10, discussed further below.

In some implementations, at 816 of FIG. 8, annotated images may be used as training data. By way of example, as discussed above the annotations may include labeling of semantic segmentation data objects associated with vehicle components. A computing system that is implementing a damage assessment model may access annotated images of vehicle components that were stored at 816 of FIG. 8. The computing system may cause the damage assessment model to consume the annotated images to train the damage assessment model.

One having skill in the art may appreciate that automated propagation of annotations may be greatly valuable for improving the accuracy of any kind of neural network. For example, mask propagation allows for automated generation of training data for solving both classification and segmentation computer vision problems. Since propagated annotations may be associated with any feature of any object of interest, these methods may be used widely for a variety of purposes. The disclosed techniques, for example, may be used to propagate semantic segmentation annotations of all car panels, damages, etc. to all available frames, increasing training dataset size for a multi-class segmentation neural network. The methods disclosed herein may be used not just to propagate masks, but also to propagate such masks to entirely new images that did not exist before, thereby generating completely novel training data.

In some implementations, the disclosed techniques may be applied to propagate multiple annotations from a single image. By way of example, any of the disclosed techniques discussed below may be executed with respect to each annotation in a set of images.

Figure 10:
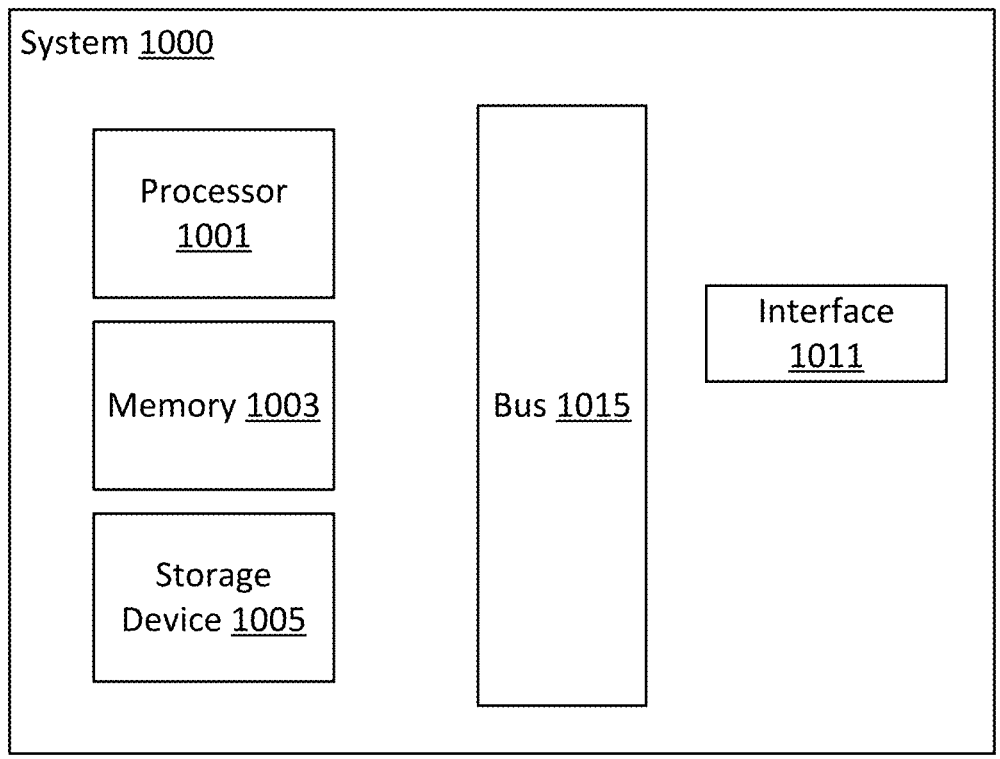
FIG. 10 illustrates one example of a computing device, in accordance with some implementations.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as a variety of devices such as artificial image generator, or any other device or service described herein. Although a particular configuration is described, a variety of alternative configurations are possible. The processor 1001 may perform operations such as those described herein. Instructions for performing such operations may be embodied in memory 1003, on one or more non-transitory computer readable media, or on some other storage device. Various specially configured devices may also be used in place of or in addition to processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include but are not limited to magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but may use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific implementations including one or more of the best modes contemplated by the inventors. While various implementations have been described herein, they have been presented by way of example only, and not limitation. Some implementations disclosed herein may be implemented without some, or all of the specific details described herein. In other instances, well known process operations have not been described in detail in order not to unnecessarily obscure the disclosed techniques. Accordingly, the breadth and scope of the present application should not be limited by any of the implementations described herein but should be defined only in accordance with the claims and their equivalents.

The invention claimed is:

1. A method comprising:
processing a plurality of captured images of an object and a background, each captured image captured from a viewpoint with a designated angle with respect to the object;
generating, based on the captured images, three-dimensional representations of the background and the object by texturizing geometric representations of the background and the object;
rendering, using the three-dimensional representations, a synthetic image of the object and the background, the synthetic image depicting a two-dimensional view of the object having a novel viewpoint different from the viewpoints of the captured images;
generating, based on the rendered synthetic image, a corrected synthetic image; and storing the corrected synthetic image on a storage medium;
wherein the three-dimensional representation of the background comprises a cylinder and a disk, the three-dimensional representation of the object being placed at the center of the disk at a base of the cylinder.

2. The method of claim 1, further comprising:
projecting an annotation from a first one of the captured images to the three-dimensional representation of the object; and
projecting the annotation from the three-dimensional representation of the object to the corrected synthetic image.

3. The method of claim 2, wherein the annotation comprises labeling of semantic segmentation data objects and the object is a car, the method further comprising:
using the corrected synthetic image as training data for a model used to assess damages in cars.

4. The method of claim 1, wherein generating the corrected synthetic image comprises using a generative adversarial network trained to transform rendered synthetic images by using the rendered synthetic images as input training data and the captured images as output training data.

5. The method of claim 4, further comprising:
determining that the corrected synthetic image is inadequate; and
discarding, responsive to determining that the corrected synthetic image is inadequate, the corrected synthetic image.

6. The method of claim 5, wherein determining that the corrected synthetic image is inadequate comprises:
determining that overlap between the rendered synthetic image and the corrected synthetic image is lower than a threshold.

7. The method of claim 5, wherein determining that the corrected synthetic image is inadequate comprises:
extracting a first silhouette of the object from the corrected synthetic image using a neural network;
extracting, from the novel viewpoint, a second silhouette from three-dimensional representation of the object;
intersecting the first silhouette with the second silhouette; and
determining, based on the intersection of the first and second silhouettes, that overlap between the first and second silhouettes is below a threshold.

8. The method of claim 1, wherein texturizing the geometric representations of the background and the object includes assigning a texture to respective surface tile of the three-dimensional representations of the background and the object, correcting colors of the texturized surface tiles by applying a photo consistency check, and seam leveling between the color-corrected texturized surface tiles.

9. The method of claim 8, wherein the respective surface tiles are triangles of a three-dimensional mesh.

10. A computing system implemented using a server system, the computing system configured to cause:
processing a plurality of captured images of an object and a background, each captured image captured from a viewpoint with a designated angle with respect to the object;
generating, based on the captured images, three-dimensional representations of the background and the object by texturizing geometric representations of the background and the object;
rendering, using the three-dimensional representations, a synthetic image of the object and the background, the synthetic image depicting a two-dimensional view of the object having a novel viewpoint different from the viewpoints of the captured images;
generating, based on the rendered synthetic image, a corrected synthetic image; and
storing the corrected synthetic image on a storage medium;
wherein the three-dimensional representation of the background comprises a cylinder and a disk, the three-dimensional representation of the object being placed at the center of the disk at a base of the cylinder.

11. The computing system of claim 10, the computing system further configured to cause:
projecting an annotation from a first one of the captured images to the three-dimensional representation of the object; and
projecting the annotation from the three-dimensional representation of the object to the corrected synthetic image.

12. The computing system of claim 11, wherein the annotation comprises labeling of semantic segmentation data objects and the object is a car, the computing system further configured to cause:
using the corrected synthetic image as training data for a model used to assess damages in cars.

13. The computing system of claim 10, wherein generating the corrected synthetic image comprises using a generative adversarial network trained to transform rendered synthetic images by using the rendered synthetic images as input training data and the captured images as output training data.

14. The computing system of claim 13, the computing system further configured to cause:
determining that the corrected synthetic image is inadequate; and
discarding, responsive to determining that the corrected synthetic image is inadequate, the corrected synthetic image.

15. The computing system of claim 14, wherein determining that the corrected synthetic image is inadequate comprises:
determining that overlap between the rendered synthetic image and the corrected synthetic image is lower than a threshold.

16. The computing system of claim 14, wherein determining that the corrected synthetic image is inadequate comprises:
extracting a first silhouette of the object from the corrected synthetic image using a neural network;
extracting, from the novel viewpoint, a second silhouette from three-dimensional representation of the object;

intersecting the first silhouette with the second silhouette; and determining, based on the intersection of the first and second silhouettes, that overlap between the first and second silhouettes is below a threshold.

17. One or more non-transitory computer readable media having instructions stored thereon for performing a method, the method comprising:

processing a plurality of captured images of an object and a background, each captured image captured from a viewpoint with a designated angle with respect to the object;

generating, based on the captured images, three-dimensional representations of the background and the object by texturizing geometric representations of the background and the object;

rendering, using the three-dimensional representations, a synthetic image of the object and the background, the synthetic image depicting a two-dimensional view of the object having a novel viewpoint different from the viewpoints of the captured images;

generating, based on the rendered synthetic image, a corrected synthetic image; and storing the corrected synthetic image on a storage medium;

wherein the three-dimensional representation of the background comprises a cylinder and a disk, the three-dimensional representation of the object being placed at the center of the disk at a base of the cylinder.

* * * * *